United States Patent [19]

Lang

[11] Patent Number: 4,462,478

[45] Date of Patent: Jul. 31, 1984

[54] SERVO STEERING

[75] Inventor: Armin Lang, Schwäbisch Gmünd, Fed. Rep. of Germany

[73] Assignee: Zahnradfabrik Friedrichshafen, AG., Friedrichshafen, Fed. Rep. of Germany

[21] Appl. No.: 379,455

[22] Filed: May 18, 1982

[30] Foreign Application Priority Data

Jun. 5, 1981 [DE] Fed. Rep. of Germany ....... 3122369

[51] Int. Cl.³ .............................................. B62D 5/08
[52] U.S. Cl. ....................................... 180/143; 91/434
[58] Field of Search ............... 180/141, 142, 143, 132; 91/434

[56] References Cited

U.S. PATENT DOCUMENTS 2,865,462 12/1958 Milliken et al. ..................... 180/143
2,893,504 7/1959 Jackson ............................... 180/143

Primary Examiner—John A. Pekar
Attorney, Agent, or Firm—Zalkind & Shuster

[57] ABSTRACT

Fluid reaction chambers are continuously pressurized by fluid supplied through fixed flow restrictors to develop equal resistances to displacement of a steering control valve in opposite directions. The reactive resistances developed by two reaction chambers are separately regulated in directional response to displacement of the control valve by discharge of fluid from at least one of the reaction chambers at a flow rate that varies as a function of vehicle speed.

8 Claims, 4 Drawing Figures

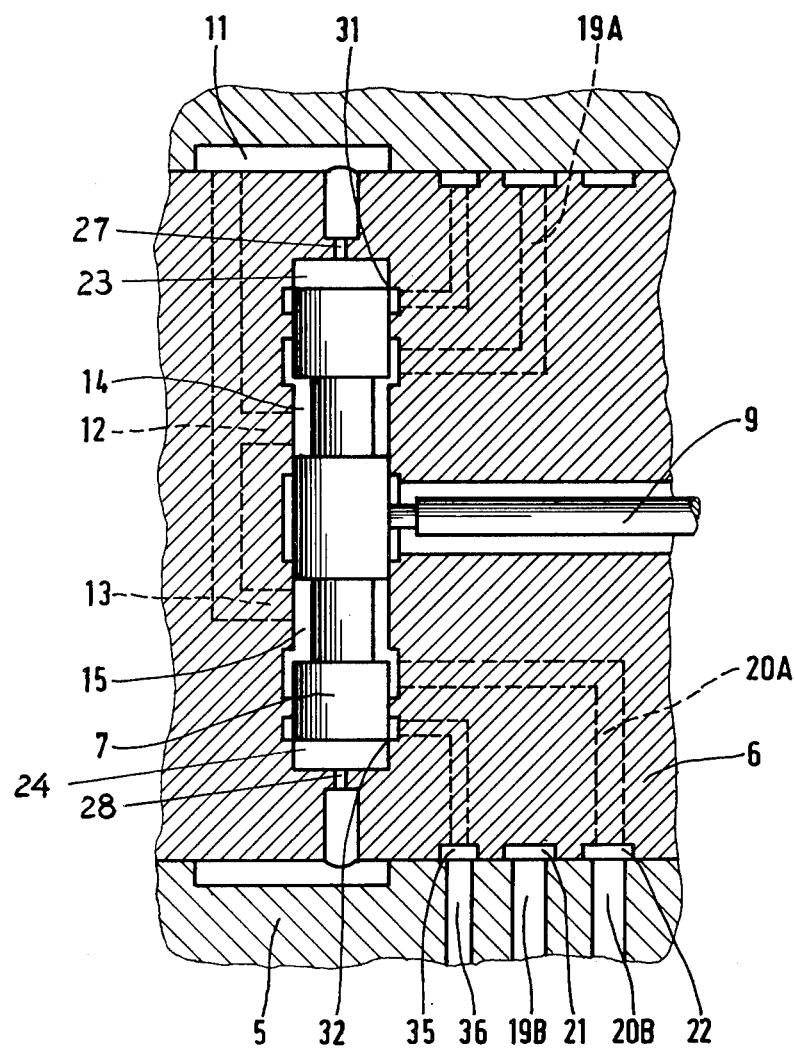

U.S. Patent    Jul. 31, 1984    Sheet 3 of 3    4,462,478
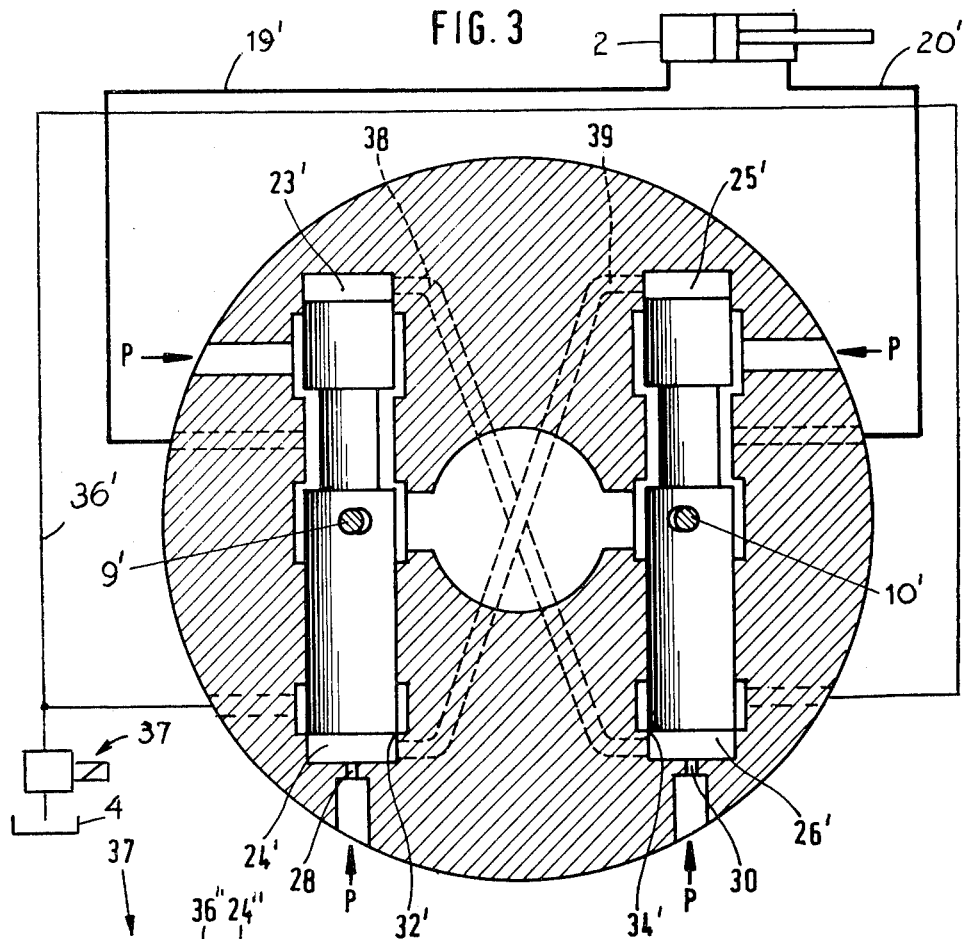
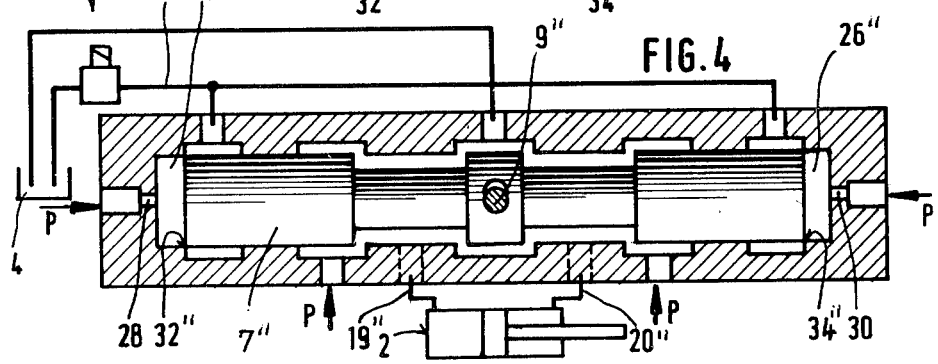

SERVO STEERING

BACKGROUND OF THE INVENTION

This invention relates to a servo steering system for automotive vehicles within which a vehicle speed dependent reaction sensing force is developed to resist manual steering effort applied.

Such speed dependent fluid powered steering systems wherein the degree of fluid reaction force developed is varied as a function of vehicle speed, is already known, as disclosed, for example, in the FIG. 10 embodiment of German Pat. OS No. 2707 991. In the foregoing prior art disclosure, a control device is shifted by a regulator to vary the flow rate of pressurized fluid from a pump and the supply of regulated reaction pressure fluid to reaction chambers. In such arrangement, two reaction chambers are interconnected and thereby subject to the same fluid reaction pressure. The valve pistons associated with a steering control valve assembly act as reaction pistons subject to the reaction pressure and are therefore limited in movement by valve housing stops permitting movement of only one piston for each steering direction. The valve pistons are not therefore restrictively controlled during operational movements so that unintended steering motion may automatically occur as a result of manlfunction. In the event there is a failure in the generation of regulated reaction pressure, the control valve assembly operates without reaction so that the steering operation will not provide any steering sense to the driver and unintended steering forces may be developed. According to other prior art arrangements, pressurized fluid from a servo pump is supplied through flow restrictors to opposing reaction chambers. The reaction chambers are hydraulically separated from each other either by the control valve and/or by one-way check valves. Such prior art arrangements produce a discontinuous reaction force during travel of the control valve through the neutral position and damping of forces because of abrupt closing of the check valves.

It is therefore an important object of the present invention to provide a low cost servo steering system in which a vehicle speed dependent reaction force is developed without the disadvantages of the aforementioned prior art arrangements.

SUMMARY OF THE INVENTION

In accordance with the present invention, a safe reaction is established on a force controlled piston valve in the event there is failure in regulation of reaction pressure in a servo steering system having the usual servo motor, servo pump, fluid reservoir and some form of vehicle speed responsive flow controlling device through which the regulated reaction pressure is developed. A control valve of which the piston valve is part is displaceable in opposite directions from a neutral position to control exhaust of fluid through the speed responsive flow controlling device from at least one of two reaction chambers within which the reaction pressure regulation occurs dependent on the direction in which the control valve is displaced. Pressurized reaction fluid is constantly fed to each of such reaction chambers from the servo pump through fixed flow restrictors so as to develop and maintain maximum reaction pressure therein when there is regulation failure of the speed responsive flow controlling device.

BRIEF DESCRIPTION OF DRAWING FIGURES

The invention will be described in greater detail hereinafter, with respect to specific embodiments as shown in the accompanying drawings, wherein:

FIG. 1 schematically illustrates a servo steering system in accordance with the present invention with the control valve assembly thereof shown in transverse section;

FIG. 2 is a longitudinal section view of the control valve taken substantially through a plane indicated by section line II—II in FIG. 1;

FIG. 3 schematically illustrates a servo steering system similar to FIG. 1, but showing another embodiment of the control valve;

FIG. 4 schematically illustrates a servo steering system with a control valve shown in longitudinal section in accordance with a third embodiment of the invention.

DETAILED DESCRIPTION OF PREFERRED EMBODIMENTS

Figure 1:
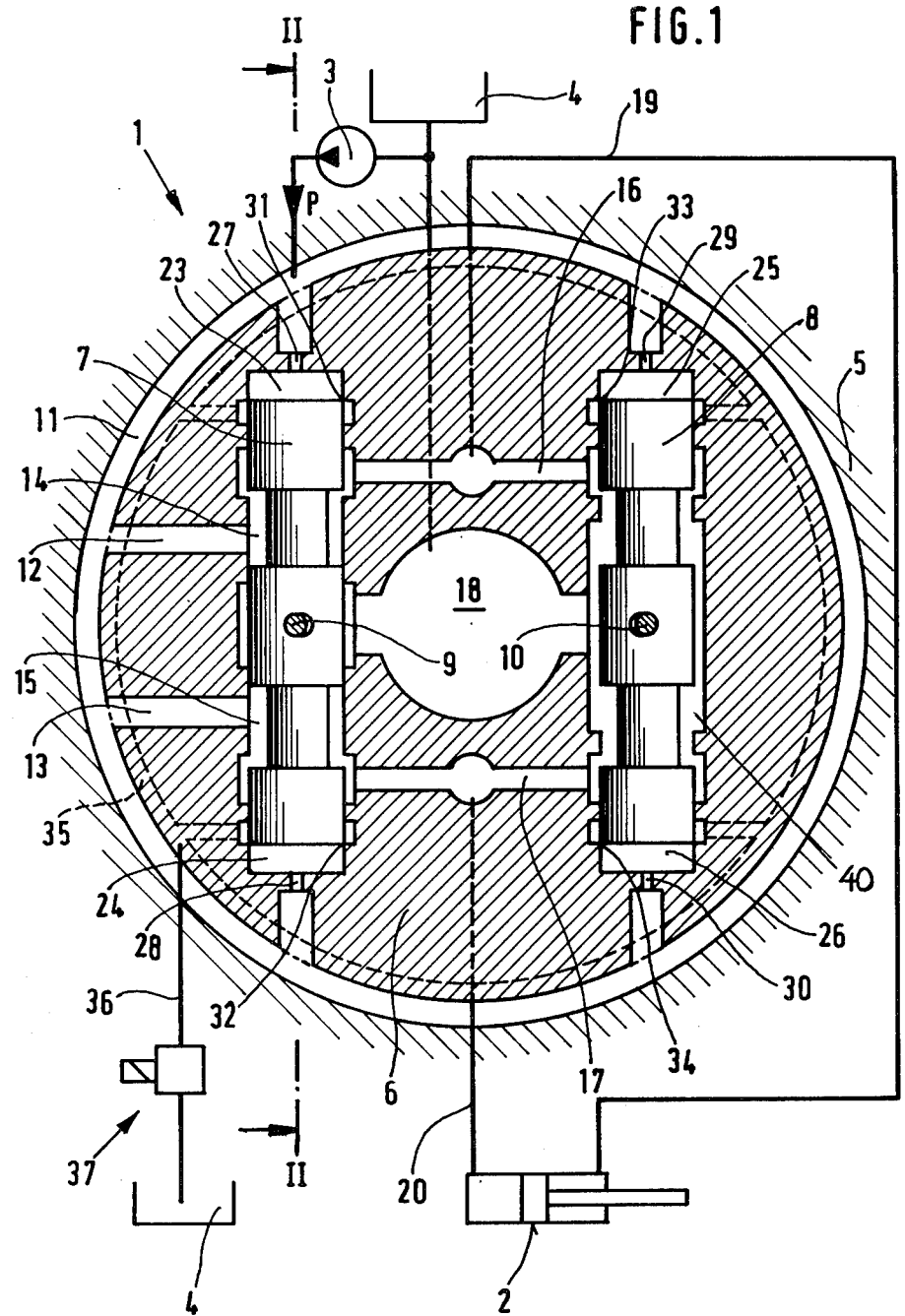

Referring now to FIGS. 1 and 2 of the drawings, a servo steering system is shown which includes a control valve assembly 1 through which pressurized fluid is fed from a servo pump 3 to a servo motor 2, the fluid being returned from the servo motor to a reservoir 4. The control valve assembly includes a valve housing body 6 that is rotatable within a steering gear housing 5, and a pair of valve pistons 7 and 8 respectively displaceable in opposite directions from the neutral position shown by two valve actuating drive pins 9 and 10. The drive pins project from a forkshaped end of a steering spindle (not shown), through which a manual steering effort is applied for displacement of the control valve in opposite directions. The pressurized fluid from pump 3 is fed to the control valve assembly through a fluid supply manifold in the form of an annular groove 11 in the housing 5. Fluid from annular manifold 11 is conducted through passages 12 and 13 in the valve body 6 to annular valve cavity spaces 14 and 15 formed between valve lands of the valve piston 7. In the neutral position shown, the annular spaces 14 and 15 are in fluid communication with the cavity 40 formed about valve piston 8, through passages 16 and 17. The valve cavity 40 is in fluid communication with a central fluid return bore 18 in the valve body 6 from which fluid is conducted to reservoir 4. As shown in FIG. 2, connecting passages 19A and 20A formed in the rotatable valve body 6 are in fluid communication with annular grooves 21 and 22 from which passages 19B and 20B in housing 5 extend to the opposed chambers of servo motor 2 for supply and exhaust of fluid. The foregoing arrangement corresponds to the passages 16 and 17 and the lines 19 and 20 as schematically shown in FIG. 1 by means of which the end valve lands on the valve pistons 7 and 8 control the supply and exhaust of fluid to and from the servo motor 2.

The end valve lands of the valve pistons 7 and 8 also act as reaction pistons subject to reaction pressure within reaction chambers 23, 24, 25 and 26 in fluid communication with annular supply manifold 11 through fixed flow restrictors 27, 28, 29 and 30 in the valve body 6. Fluid is discharged from the reaction chambers under control of flow control edges 31, 32, 33 and 34 formed between the valve body 6 and the end lands of the valve pistons 7 and 8. Such control edges have zero overlap or are axially aigned in the neutral position, as shown, so that slightly open or closed discharge flow passages are formed depending on the dimensional tolerances involved. Such discharge flow passages conduct fluid from the reaction chambers to a common annular channel 35 formed in the valve body 6 to which a flow controlling device 37 is connected through a reaction pressure regulating line 36.

The flow controlling device 37 may be part of or constituted by a nozzle-baffle plate system, for example, as disclosed in U.S. Pat. No. 3,690,400, or an electrohydraulic converter, as disclosed in German Patent Application No. 30 41 824. The significance of the device 37 utilized resides in the establishment of a flow restriction in reaction line 36, of variable flow restricting area through which fluid is conducted to the reservoir 4. The flow restriction rate associated with device 37 is furthermore adjusted or varied as a direct function of vehicle speed so that at vehicle standstill there is substantially no flow through device 37.

When the control valve assembly 1 is displaced in one directional sense for executing a right turn, for example, the valve piston 7 moves upwardly as viewed in FIG. 1, while the valve piston 8 moves downwardly in the opposite directional sense. As a result of such valve movement, fluid line 19 is pressurized and the fluid line 20 is depressurized by exhaust to the reservoir 4. At the same time, a pair of the valve control edges at 31 and 34 close the associated valve passages while the valve passages at 32 and 33 are opened to effect pressure reducing regulation for the pressurized fluid in reaction chambers 24 and 25. Depending on the load on the servo motor 2, the pump pressure in fluid supply manifold 11 increases to develop the pressure regulating flow through fixed restrictors 28 and 29, the reaction chambers 24 and 25, the annular channel 35, the reaction line 36 and the control device 37 to reservoir 4. No such flow occurs through the other flow restrictors 27 and 30 because of the closed valve passages at 31 and 34 so that pump pressure prevails in the reaction chambers 23 and 26. A differential pressure is thereby developed on each of the valve pistons 7 and 8 dependent on the speed controlled adjustment of device 37 to oppose or resist displacement of the control valve assembly through the drive pins 9 and 10. As the flow rate through device 37 is increased with vehicle speed, the differential reaction pressure is increased.

In the foregoing arrangement, the reaction chambers 24 and 26 are respectively regulated independently of each other because of their hydraulic separation by the fixed flow restrictors 28 and 30. Accordingly, should there be failure in the operation of control device 37, the maximum reaction pressure developed in the reaction chambers at opposite ends of each valve piston 7 and 8, is maintained. A balanced pair of reaction forces will therefore be available on the steering spindle. Because of the reaction pressure distribution on the two valve pistons, the use of reduced control valve dimensions in the design of the servo steering system for any given installation is possible.

According to the embodiment shown in FIG. 3, speed controlled regulation for reaction pressure is separately provided only for two reaction chambers 24' and 26' to which fluid under pump pressure is constantly or continuously fed through fixed flow restrictors 28 and 30. Thus, only the lower ends of valve pistons 7' and 8' form control valve edges at 32' and 34' for controlling reaction pressure regulating flow through reaction line 36' to control device 37. The reaction chambers 23' and 25' are not separately regulated as in the case of the embodiment of FIG. 1. Instead, reaction chamber 23' is connected to reaction chamber 26' by passage 38 while passage 39 interconnects reaction chambers 25' and 24'. In the embodiment of FIG. 3 as in FIG. 1, reaction chambers are disposed at opposite ends of each valve piston 7' and 8' to balance the reactive resistance to control valve displacement torque applied through drive pins 9' and 10'. With both valve pistons participating actively in both steering directions to produce the reaction forces, smaller valve piston diameters may be utilized.

As an alternative to the arrangement shown in FIG. 3, the end spaces 23' and 25' may be eliminated as reaction pressure chambers by proper dimensioning of the cross-sections of the valve pistons 7' and 8' and connecting the spaces 23' and 25' directly to the pump supply manifold. In such case, the essential advantage associated with the use of four reaction chambers is lost.

The functions respectively performed by the two valve pistons as described with respect to FIGS. 1 and 3, may be performed by a common valve piston 7" as shown in FIG. 4. The structure and function of the embodiment of FIG. 4 otherwise corresponds to the embodiments of FIGS. 1 and 3. Thus, the valve piston 7" is displaced in opposite directions from the neutral position shown by a single drive pin 9" to control the supply and exhaust of fluid to and from servo motor 2 through lines 19" and 20". Two reaction chambers 24" and 26" are supplied with pressurized pump fluid through fixed flow restrictors 28 and 30 at opposite ends of the valve piston having control valve edges at 32" and 34" through which reaction regulation flow is conducted to reaction line 36" connected to control device 37. The arrangement of FIG. 4 will be suitable for installations of limited space insufficient to accommodate two valve pistons.

It will be apparent from the foregoing description that the maintenance of maximum reaction pressures in the two reaction chambers respectively associated with the opposite steering directions assures safe operation of the steering system despite failure of the device 37. Further, during slow vehicle travel when device 37 almost closes off discharge flow from the reaction chambers, the low differential reaction force developed is occasioned by a minimal leakage flow of fluid from the regulated reaction chambers. Full servo power operation will therefore be available for low speed vehicle maneuvering, such as parking. During rapid travel of the vehicle, the maximum differential reaction forces are developed as hereinbefore explained occasioned by maximum control flow rate of fluid from the reaction chambers through device 37. The servo power for steering operation will therefore be reduced to a minimum to meet the lower steering power demands of small steering displacements at the higher vehicle speeds.

What is claimed is:

1. In a servo steering system for motor vehicles, having a servo motor, a servo pump, a reservoir, a control valve and a control device connected to the control valve from which fluid is discharged to the reservoir at a restricted flow rate varied in dependence on vehicle speed, said control valve including at least one movable valve piston and at least two reaction chambers, the improvement comprising means for displacing the valve piston (7, 8, 7', 8', 7") from a neutral position, a pair of fixed flow restrictors (28 and 30) respectively connected to and exclusively separating said two reaction chambers (24, 26, 24', 26', 24", 26"), means for supplying pressurized fluid from the servo pump continuously through the respective flow restrictors to the reaction chambers, and valve passage means responsive to said displacement of the valve piston for alternatively connecting the reaction chambers to the control device (37), said valve passage means including a pair of control edges (32, 34, 32', 34', 32", 34") on the valve piston.

2. The servo steering system as defined in claim 1, wherein the control valve includes a second movable valve piston (8, 8') displaceable simultaneously with said one valve piston in an opposite directional sense, and including two additional reaction chambers (23, 25, 23', 25') interconnected in parallel to the first mentioned two reaction chambers (24, 26, 24', 26').

3. The servo steering system as defined in claim 2 including an additional pair of fixed flow restrictors (27 and 29) connecting the fluid supplying means to the additional pair of reaction chambers (23, 25).

4. The servo steering system as defined in claim 2 including a pair of flow passages (38 and 39) interconnecting the two pair of reaction chambers (23', 24', 25', 26').

5. The servo steering system as defined in claim 1 wherein said conrol edges (32, 32', 34, 34') of the valve passage means are aligned in the direction of displacement in the neutral position of the valve piston.

6. In a servo steering system for a vehicle having a servomotor (2), a servo pump (3), a fluid reservoir (4), a fluid flow controlling device (37) from which pressurized fluid is discharged to the reservoir at a variable flow rate that is a direct function of vehicle speed, steering control valve means (1) displaceable from a neutral position for supply of the pressurized fluid from the pump to the servomotor and to fluid reaction chambers resisting said displacement of the control valve means, the improvement including at least two fixed flow restrictors (28 and 30) connected to and exclusively separating the fluid reaction chambers, fluid supply means operatively connecting the pump to said flow restrictors for continuous supply of the pressurized fluid at restricted flow rates to the reaction chambers to separately develop therein opposing reaction pressures, and valve passage means (32, 34, 32', 34', 32", 34") on the control valve alternately conducting the pressurized fluid from the reaction chambers to the fluid flow controlling device in directional response to said displacement of the control valve for regulating one of said opposing reaction pressures as a direct function of the variable flow rate of fluid discharged from the flow controlling device.

7. The servo steering system as defined in claim 6 wherein the fluid reaction means includes at least two reaction chambers (24, 26, 24', 26', 24", 26") within which said opposing reaction pressures are developed.

8. The servo steering system as defined in claim 7, wherein said valve passage means comprises control edges formed on the control valve means controlling flow of fluid from the reaction chambers to the flow controlling device.

* * * * *